United States Patent [19]

Hirahara et al.

[11] 4,261,677
[45] Apr. 14, 1981

[54] VERTICALLY ADJUSTABLE CROSS CONVEYOR

[75] Inventors: Stanley K. Hirahara, Reedley; Donald M. Grey, Selma; Richard W. Bouwhuis, Reedley, all of Calif.

[73] Assignee: Sperry Corporation, New Holland, Pa.

[21] Appl. No.: 27,423

[22] Filed: Apr. 5, 1979

[51] Int. Cl.³ .................. A01D 87/12; B65G 57/32
[52] U.S. Cl. .................. 414/39; 198/692; 198/862; 414/503; 414/900
[58] Field of Search .......... 414/38, 39, 40, 44, 414/68, 111, 502, 503, 900; 198/312, 692, 719, 725, 728, 734, 862

[56] References Cited

U.S. PATENT DOCUMENTS

| | | | |
|---|---|---|---|
| 2,601,618 | 6/1952 | Kringle | 414/503 |
| 2,848,127 | 8/1958 | Grey | 414/39 |
| 3,330,424 | 7/1967 | Grey et al. | 414/39 |
| 3,545,596 | 12/1970 | Turnbough | 198/862 |
| 3,687,302 | 8/1972 | Castro | 414/40 |
| 3,880,073 | 4/1975 | Eberly et al. | 198/692 X |

FOREIGN PATENT DOCUMENTS

| | | | |
|---|---|---|---|
| 248036 | 5/1963 | Australia | 198/728 |
| 143712 | 10/1901 | Fed. Rep. of Germany | 198/728 |

*Primary Examiner*—Leslie J. Paperner
*Attorney, Agent, or Firm*—Frank A. Seemar; John B. Mitchell; Martin Fruitman

[57] ABSTRACT

A vertically adjustable conveyor to load hay bales onto a bale wagon. The chain conveyor with cleats to catch the bales is held to the bale wagon frame by bolts which pierce slots on the conveyor support. Adjustment of the distance of the extension of the cleats through the support table on which the bales move is accomplished by moving the slots relative to the bolts.

5 Claims, 2 Drawing Figures

VERTICALLY ADJUSTABLE CROSS CONVEYOR

BACKGROUND OF THE INVENTION

This invention relates generally to bale wagons for retrieving bales from a field, and more specifically to wagons in which a cross-conveyor moves the picked up bales across the width of the wagon to form a row of bales as wide as the wagon. The cross-conveyor, receiving bed and specific other certain features are disclosed in U.S. Pat. Nos. 2,848,127 and 3,330,424.

The bale wagons to which the previously noted patents apply, function to automatically pick up and stack bales, such as hay bales, from the positions in which they are dropped by hay cutting and baling machines which precede the bale wagons in fields.

The bale wagons operate by moving along a line of bales lying in a field, and aligning the chute-like front of the machine, the bale loader, with each bale. A vertical chain conveyor with protruding cleats lifts the bale upward and a deflector then tips the bale sideways, onto the receiving bed of the wagon at a point which is essentially the foremost portion of one of the side edges of the wagon.

At this point the cross-conveyor moves the bale across the width of the wagon, forming a one bale wide row at the leading edge of the wagon. The receiving bed, when filled with its full compliment of bales is tipped rearward placing the bales onto a larger bed, called the transfer bed, where several rows of bales are then accumulated. When a predetermined number of rows have been accumulated to fill the transfer bed, this bed, in turn, is tipped rearward to begin the formation of a multilayer stack of bales with a first full height vertical tier. Typical bale wagons are also capable of automatically unloading an entire stack, for some bale wagons as many as 160 bales.

Despite all their impressive versatility, prior art bale wagons do, however, have faults. The cross-conveyors on the receiving bed, designed to move the bales across the width of the wagon, contain cleats to engage the hay bales, but the location of the cleats in the prior art has not been entirely satisfactory. The variation in density of bales, caused by changing conditions of moisture content and other field conditions, causes unsatisfactory results with either extremely dense bales or very light ones. Since the position of the cleats, the cleat elevation, has generally been selected as a compromise between the lower, less aggressive, cleats required for dense bales and the higher, more aggressive cleats needed for loose fluffly bales, the resulting compromise has not been able to satisfactorily span the entire range of bale density found in normal use.

It is therefore an object of this invention to provide a cross-conveyor for a bale wagon which will satisfactorily operate with all types of bales.

It is another object of this invention to furnish a cross-conveyor which can be adjusted for height of cleats in the field.

It is still another object of this invention to provide a cross-conveyor with sufficient field adjustment capability to compensate for minor distortion of the conveyor parts in either manufacture or use.

SUMMARY OF THE INVENTION

These objectives are accomplished by the use of the present invention, in which the cross-conveyor is adjustable for the amount of protrusion of the cleats above the receiving bed.

The receiving bed is a planar surface across the front of the bale wagon onto which the vertical chain conveyor pushes each hay bale. The receiving bed is oriented to receive several bales lengthwise across the front of the wagon. In order to move the bales along the length of the receiving bed, a chain conveyor is located on the portion of the receiving bed onto which the hay bales are first delivered.

The chain conveyor operates through an opening in the receiving bed and engages each bale by means of cleats protruding through the opening.

The present invention contemplates cleats which are adjustable in the amount they protrude through the opening and therefore in the degree to which they come into contact with the bales. Cleats which protrude less are required for heavier, more dense bales, while higher cleats are desirable for light, fluffy bales to prevent the lower cleats from tearing the lighter bales.

The adjustment apparatus of the preferred embodiment of the invention is a simple nut, bolt and slotted hole system. The chain conveyor is attached to its own support and guide track. This support is then bolted to the bale wagon frame in an orientation which places the conveyor cleats approximately midway between the leading and trailing edges of the receiving bed.

Adjustment of the cleat height is accomplished by loosening the nuts and bolts holding the chain conveyor support to the frame and sliding the support up or down within the slots on its base flange. Retightening the nuts and bolts locks the support in its new position for use with bales of different composition.

DETAILED DESCRIPTION OF THE INVENTION

Figure 1:
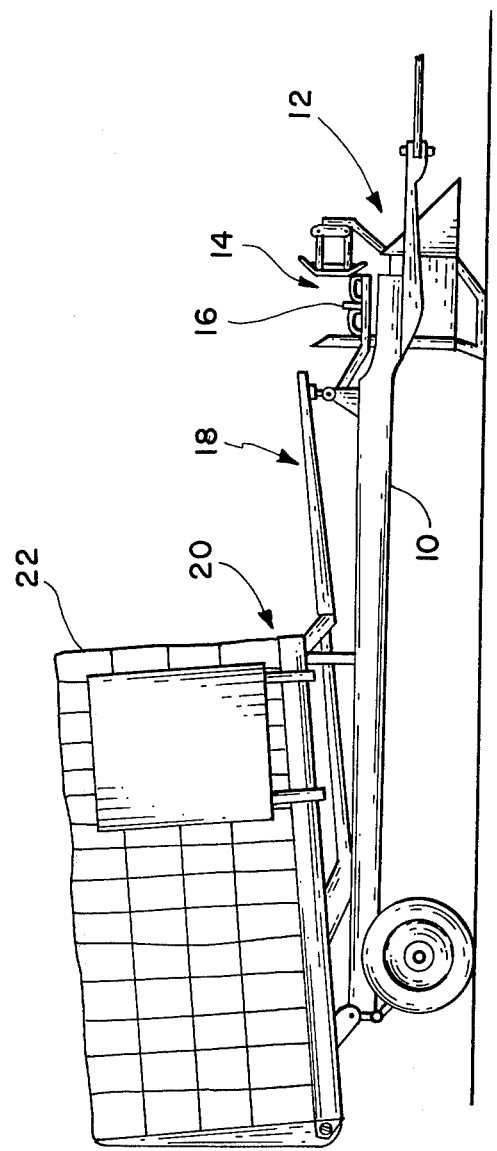
FIG. 1 is a side view of a bale wagon showing the general location of major components and the position of the receiving bed.

A typical bale wagon upon which the invention is located and used is shown in FIG. 1. The wagon includes a chassis 10, a bale loader 12, a receiving bed 14, where cleats 16 of the invention are located, a transfer bed 18 and a load bed 20.

Bale loader 12 is located at one side of the forward end of chassis 10 where it can deposit bales onto one end of receiving bed 14. Receiving bed 14, when fully loaded, tilts rearward to deposit the bales on transfer bed 18, which, in turn, when loaded, tilts rearward and deposits a tier of bales 22 onto load bed 20.

Figure 2:
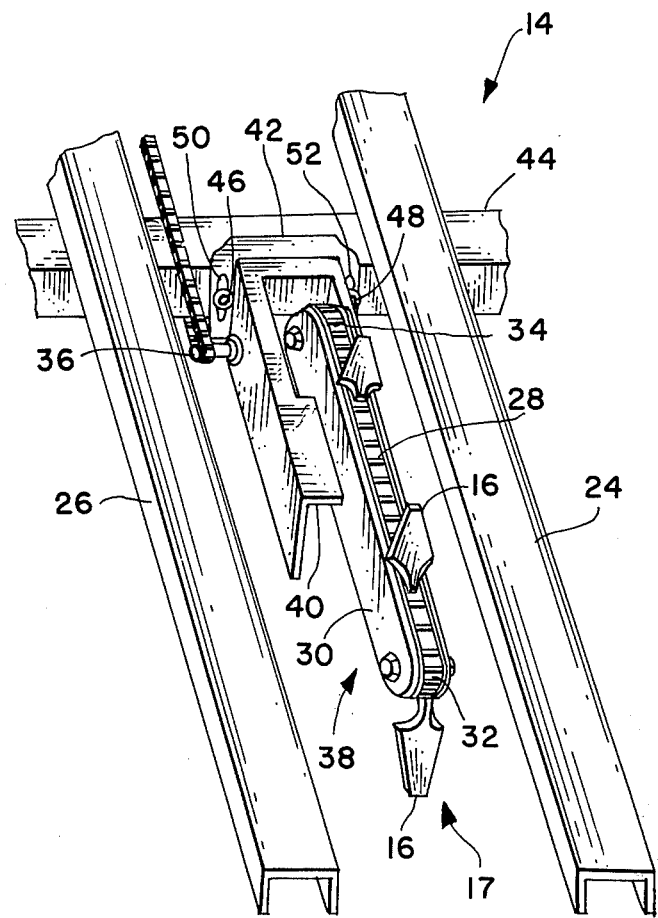
FIG. 2 is a perspective view of the receiving bed showing the bale conveyor.

The preferred embodiment of the invention is pictured in FIG. 2 where receiving bed 14 is shown in detail. Bed elements 24 and 26 form the essentially planar surface of receiving bed 14, above which cleats 16 protrude through opening 17. Cleats 16 are attached to endless chain 28 which is held in place by enclosure 30 which determines its path. Chain 28 moves across sprockets 32 and 34 at both ends of enclosure 30. Power to chain 28 is supplied through drive sprocket 36. The entire conveyor mechanism 38 is mounted upon support 40 which is formed with vertical flange 42 at one end. Vertical flange 42 is fastened to frame member 44 by means of nut-bolt pairs 46 and 48, which pierce vertical flange 42 by means of slots 50 and 52.

Use of the invention to vary the degree of engagement of cleats 16 with bales placed upon bed elements 24 and 26 involves loosening nut-bolt pairs 46 and 48 vertically moving slots 50 and 52 relative to them. As support 40 is lowered, cleats 16 engage bales less aggressively, as is required for heavy, dense bales, and as support 40 is raised, cleats 16 have more engagement with the bales. This more aggressive contact is required to prevent tearing apart light, fluffy bales.

The adjustment can also be used to compensate for minor distortions if any occur in the conveyor system due to manufacture or field operation.

It is to be understood that the form of the invention herein shown is merely a preferred embodiment. Various changes may be made in the size, shape and the arrangement of parts; equivalent means may be substituted for those illustrated and described; and certain features may be used independently from others without departing from the spirit and scope of the invention as defined in the following claims.

For instance, other non-fixed attachment means, such as a clamp and track combination, could be used, instead of the nut-bolt-slot combination, to yield the same vertical adjustment capabilities.

What is claimed as new and desired to be secured by Letters Patent of the United States is:

1. In a bale wagon having a wheel supported frame adapted to travel along a series of bales lying on the ground in spaced relation to each other, a bale loader mounted on the leading end of the frame adapted to be guided into registry with the series of bales, a receiving bed mounted on the frame adapted to receive at least one bale from the bale loader and support it in a receiving plane, the receiving bed further having a vertical opening extending in a direction parallel to its length dimension, a bale conveyor mechanism mounted on the frame adjacent to the receiving bed, the bale conveyor mechanism including an endless chain with spaced apart cleats movable in a predetermined path, the cleats extending through the vertical opening in the receiving bed and through the receiving plane during a portion of their movement along the predetermined path in order that the cleats engage and move bales on the receiving bed, the improvement wherein:

the bale conveyor mechanism is vertically adjustably mounted on the frame so that the extension of the cleats through the opening may be altered to meet changing bale conditions and wherein the bale conveyor mechanism includes:

a mounting means comprising at least two bolt-nut pairs piercing holes in the frame;

a rigid support arm having a first end and a second end;

a vertical faceplate afixed to the first end of the support arm, the faceplate including at least two spaced apart vertical mounting through slots so that the support arm may be bolted to the frame and vertically adjusted by manipulation of the bolt-slot-frame relationship.

2. The bale wagon of claim 1 wherein the bale conveyor mechanism further includes:

a first sprocket rotatably mounted on the support arm adjacent to the first end of the support arm; and a second sprocket rotatably mounted on the support arm adjacent to the second end of the support arm, the endless chain being engaged by the first and second sprockets thereby defining the predetermined path.

3. The bale wagon of claim 2 wherein the cleats on the uppermost span of chain between the first and second sprockets extend through the vertical opening in the receiving bed.

4. The bale wagon in claim 3 further including a driven sprocket, rotatably mounted on the support arm to impart motion to the endless chain.

5. In a bale wagon having a wheel supported frame adapted to travel along a series of bales lying on the ground in spaced relation to each other, a bale loader mounted on the leading end of the frame adapted to be guided into registry with the series of bales, a receiving bed mounted on the frame adapted to receive at least one bale from the bale loader and support it in a receiving plane, the receiving bed further having a vertical opening extending in a direction parallel to its length dimension, a bale conveyor mechanism mounted on the frame adjacent to the receiving bed, the bale conveyor mechanism including an endless chain with spaced apart cleats movable in a predetermined path, the cleats extending through the vertical opening in the receiving bed and through the receiving plane during a portion of their movement along the predetermined path in order that the cleats engage and move bales on the receiving bed, the improvement wherein:

the bale conveyor mechanism is vertically adjustably mounted on the frame so that the extension of the cleats through the opening may be altered to meet changing bale conditions, said adjustable mounting including a support member, a faceplate connected to the support member and having slots formed therein, and adjustable fasteners extending through the slots and connected to the frame.

* * * * *